United States Patent
Siemens et al.

(10) Patent No.: US 8,995,268 B2
(45) Date of Patent: Mar. 31, 2015

(54) METHOD FOR CONTROLLING A FLOW IN A PACKET SWITCHING NETWORK

(75) Inventors: Eduard Siemens, Sehnde (DE); Daniel Eggert, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 390 days.

(21) Appl. No.: 13/138,188

(22) PCT Filed: Jan. 6, 2010

(86) PCT No.: PCT/EP2010/050081
§ 371 (c)(1),
(2), (4) Date: Jul. 18, 2011

(87) PCT Pub. No.: WO2010/084034
PCT Pub. Date: Jul. 29, 2010

(65) Prior Publication Data
US 2011/0273985 A1   Nov. 10, 2011

(30) Foreign Application Priority Data
Jan. 20, 2009   (EP) .................................. 09305053

(51) Int. Cl.
H04L 12/801 (2013.01)
H04L 12/841 (2013.01)
H04L 12/853 (2013.01)
H04L 12/835 (2013.01)
H04N 21/24 (2011.01)

(52) U.S. Cl.
CPC ............ H04L 47/10 (2013.01); H04L 47/2416 (2013.01); H04L 47/283 (2013.01); H04L 47/30 (2013.01); H04N 21/2401 (2013.01)
USPC ........................................................ 370/235

(58) Field of Classification Search
CPC ............ H04L 2012/5681; H04L 47/10; H04L 47/2416; H04L 47/283; H04L 47/30
See application file for complete search history.

(56) References Cited

U.S. PATENT DOCUMENTS 5,995,486 A * 11/1999 Iliadis ........................... 370/229
7,706,462 B2    4/2010 Abe
2004/0064576 A1 *  4/2004 Goldhor et al. ............... 709/232

FOREIGN PATENT DOCUMENTS

JP     2001144802 A     5/2001
JP      200614066 A     1/2006

OTHER PUBLICATIONS

Chia-Hui Wang etal: "A Control-Theoretic Mechanism for Rate-based Flow Control of Realtime Multimedia Communication", IEEE,Sep. 2001,p. 1-6.

(Continued)

*Primary Examiner* — Jianye Wu
(74) *Attorney, Agent, or Firm* — Myers Wolin LLC (57) ABSTRACT

The invention is related to the field of flow control between two computing nodes over a packet switching network. Furthermore, the invention concerns a method for controlling data flow between a sending node and a receiving node over a packet switching network, data being sent with a current data rate onto a protocol-specific buffer of the receiving node, an application reading data stored in the buffer at a playback rate, According to the invention, it involves the following steps:
  Notifying by the sending node to the receiving node about its maximum sending rate;
  Determining by the receiving node a desired sending rate value for the sending node from playback rate value;
  when the desired sending rate value is significantly different from the current data rate value, notifying the desired sending rate value by the receiving node to the sending node.

20 Claims, 4 Drawing Sheets

(56) References Cited

OTHER PUBLICATIONS

Youn-Sik Hong etal: "A Cost Effective Rate Control for Streaming Video Dedicated to Wireless Handheld Devices", 2008 Int'l Conf, IEEE,pp. 537-542.
Search Report dated Jun. 1, 2010.
Tamura et al., "Study on Rate Control using Prediction on Handover in Wireless LANS", IPSJ SIG Technical Reports, 2006-AVM-53, Jul. 14, 2006.
Postel, Jon, "Transmission Control Protocol", DARPA Internet Program Protocol Specification, RFC 793, University of Southern California Information Sciences Institute, Sep. 1, 1981, pp. 1-82.

\* cited by examiner

METHOD FOR CONTROLLING A FLOW IN A PACKET SWITCHING NETWORK

This application claims the benefit, under 35 U.S.C. §365 of International Application PCT/EP2010/050081, filed Jan. 6, 2010, which was published in accordance with PCT Article 21(2) on Jul. 29, 2010 in English and which claims the benefit of European patent application No. 09305053.2, filed on Jan. 20, 2009.

FIELD OF THE INVENTION

The invention is related to the field of flow control between two computing nodes over a packet switching network. Furthermore, the invention also relates to a method of flow control.

BACKGROUND OF THE INVENTION

Bandwidth of a public packet switching network is shared by all kinds of applications to achieve statistical multiplexing gain. This share of resource introduces considerable uncertainty in workload and resource requirements. While delivering packets through such a network, the unpredictable delay jitter may introduce underflow or overflow in a limited client buffer even if the network is error-free at a time period. However, different from conventional text/image network applications, multimedia applications require end-to-end quality-of-service (QoS) with jitter-free playback of audio and video. Thus a good end-to-end flow control mechanism is needed to maintain high throughput and keeping average delay per packet at a reasonable level for such time-critical applications like multimedia communications.

Flow control is after congestion control, one of the major objectives of connection management in the area of reliable connection oriented data transmission. Congestion control prevents the network in a whole to be flooded. In contrast, the main goal of the flow control is to prevent a slow or even busy reception node from being flooded by a faster data sender. "Rate-based" and "window-based" mechanisms are the two best-known approaches for flow control.

General TCP flow control which is described in [Pos81] (Postel, Jon: Transmission Control Protocol—DARPA Internet Program Protocol Specification, RFC 793, University of Southern California—Information Sciences Institute (1981)) uses a window-based flow control mechanism. A receiver returns a "window" with every acknowledgment indicating a range of acceptable sequence numbers beyond the last received segment. The window indicates an allowed number of bytes the sender may transmit before receiving further permission. The disadvantage of this method is a burst way of sending, which even amplifies on high Bandwidth Delay Product links (also called "high BDP links").

On the other hand, rate-based flow control can provide end-to-end deterministic and statistical performance guarantees over packet switching networks. The rate adjustment is performed by the intensive feedback controls from client to achieve guaranteed QoS. One rate-based approach is described in [Wan01] (Wang, Chia-Hui; Ho, Jan-Ming; Chang, Ray-I and Hsu, Shun-Chin: A Control-Theoretic Mechanism for Rate-based Flow Control of Realtime Multimedia Communication, Techn. Ber., Department of Computer Science and Information Engineering, National Taiwan University, Taipei, Taiwan, R.O.C. and Institute of Information Science, Academia Sinica, Taipei, Taiwan, R.O.C. (2001), multimedia, Internet, Video Technologies 2001 (MIV 2001) of WSES/IEEE International Multi-conference). This method uses a closed loop control mechanism to adapt the sender's data rate. The control theoretic "device to control" is the receive-buffer-occupancy (BO). If the BO value exceeds a given threshold, the receiver gives a feedback about its BO to the sender. The sender uses a Proportional, Derivative (PD) rate control to calculate a new sending rate from the received BO feedback. The method proposed by Wang relies only on the current sending rate and the changes of the receive-buffer-occupancy. Effective receive rate of an application located on receiver is not directly taken into account. That is the reason why fluctuations of this rate stay almost unaccounted. On high BDP links this could lead to unintended buffer overflows or underruns, respectively. A drawback of method proposed by Wang is that it ignores also amount of data currently readable from buffer, which could cause unnecessary or even wrong speed adjustments.

One of the goals of the present invention is to propose a rate-based flow control mechanism providing a more effective and reliable data flow control even on erroneous high BDP links than state-of-the art flow Control mechanisms and allowing a more efficient network resources utilization than the known approaches.

SUMMARY OF THE INVENTION

The technical problem the present invention intends to solve is to govern a sending rate of a sender to avoid flooding of a receiver and allowing the data sender to optimally adjust its sending data rate according to the data reception rate at the receiver's application level.

Thus, the present invention concerns, a method for controlling data flow between a sending node SN and a receiving node RN over a packet switching network, data being sent with a current data rate SR onto a protocol-specific buffer BU of the receiving node RN, an application AP reading data stored in the buffer BU at a playback rate SPR. According to the invention, it involves the following steps:

Notifying by the sending node SN to the receiving node RN about its maximum sending rate SRMax;

Determining by the receiving node RN a desired sending rate DSR value for the sending node SN from playback rate SPR value;

When the desired sending rate DSR value is significantly different from the current data rate SR value, notifying the desired sending rate DSR value by the receiving node RN to the sending node SN.

BRIEF DESCRIPTION OF THE DRAWINGS

Embodiments of the invention are described in text form hereinafter and are illustrated with drawings, which show in.

DETAILED DESCRIPTION OF PREFERRED EMBODIMENTS

Figure 1A:
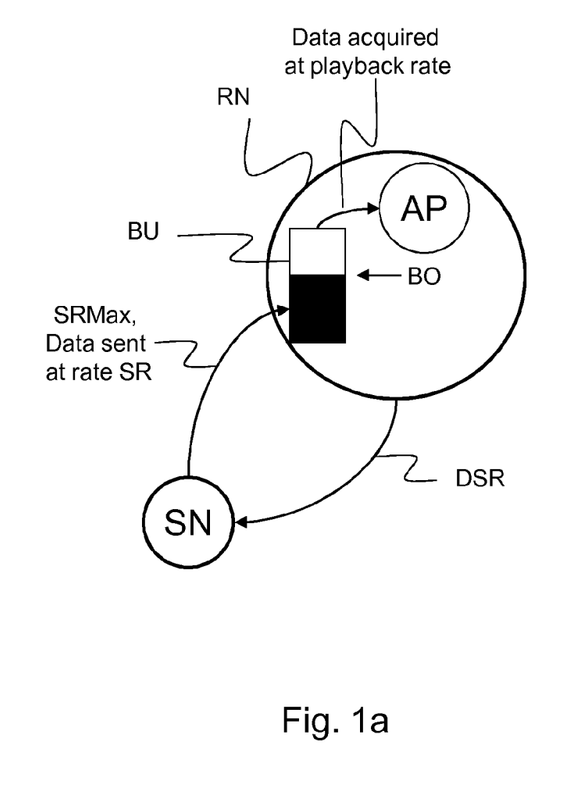
FIG. 1a: data exchanges between a sending node SN and a receiving node RN.

FIG. 1a illustrates data exchanges between a sending node SN and a receiving node RN which comprises a protocol-specific buffer BU. The sending node SN sends data to the receiving node RN at a current sending rate SR expressed for example in MBit per second. At reception by the receiving node RN, data is stored in the buffer BU. At least one application AP runs on the receiving node RN and acquires data at a playback rate.

The application AP is for example a Media player, which receives video data from a sending nodes SN and plays back that data out to a video screen. In another example, the data sent is media streaming and the application AP can also be applied to file transfer, Database replication and so on.

The buffer occupancy BO is the size of the buffer space occupied by the data received by the receiving node RN, the buffer BU has a storage capacity denoted as totalBufferSize.

Figure 1B:
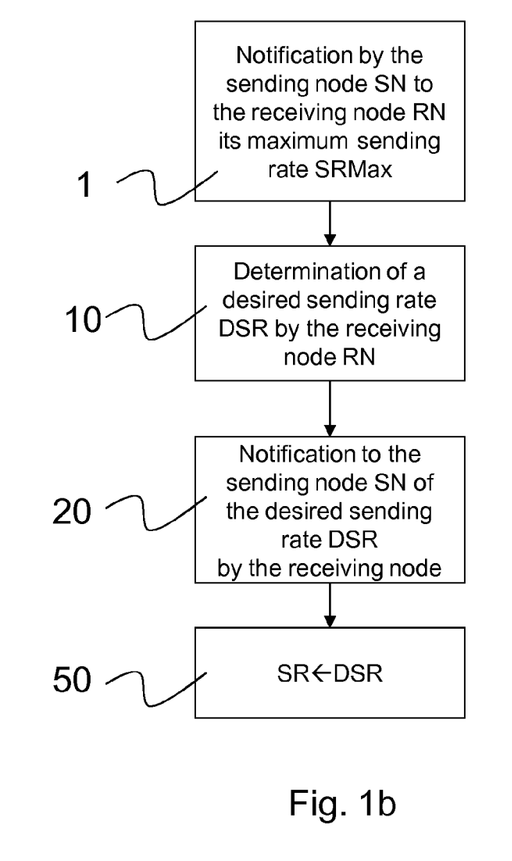
FIG. 1b: an exemplary flowchart of the method for controlling data flow according to the invention comprising a succession of four main steps.

An example of flowchart for implementing the method according to the invention is shown on FIG. 1b. The flow control mechanism implemented by the method according to the invention uses a rate-based approach.

At a first step 1, for example during a connection setup, the sending node SN notifies a receiving node RN about its maximum sending rate SRMax, which is the highest rate the sending node SN is able to send data to the receiving node RN. The receiving node RN notifies the sending node SN about a desired sending rate DSR, for instance during a latter step 20.

A calculation for determining the desired sending rate DSR value is done at the receiving node RN during an intermediary step 10. Hereby, the desired sending rate DSR is calculated from a smooth playback rate SPR which is determined by observation of the playback rate or "brut" playback rate.

Therefore, the playback-rate is subject to fluctuations caused by non-constant bit-rate of data retrieval by the application AP. In order to eliminate minor fluctuations e.g. rounding errors while rate computation, the playback-rate is smoothed by applying a temporal moving average, for example the "Exponentially Weighted Moving Average" (EWMA) method is used to get a smooth playback rate SPR. EWMA consists in applying weighting factors which decrease exponentially. The weighting for each older data point decreases exponentially, giving much more importance to recent observations while still not discarding older observations entirely.

Advantageously, the playback rate SPR value used for conducting test and determination of desired sending rate DSR value is value issued by a moving average method of playback rate such as EWMA method.

Figure 2:
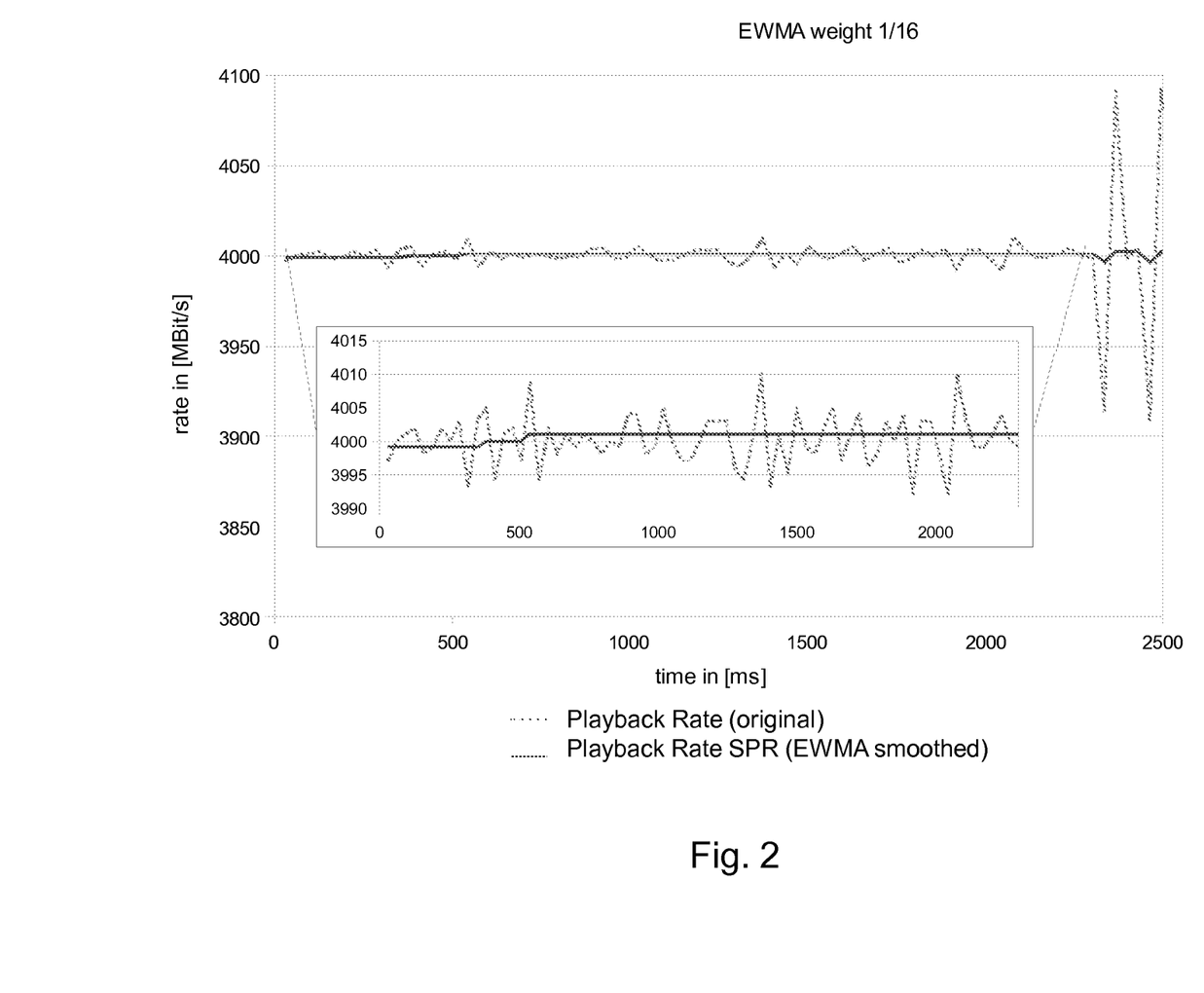
FIG. 2: an illustration of the difference between a "brut" playback rate and a smoothed playback rate.

FIG. 2 compares temporal evolutions of the values of "brut" playback-rate, i.e. playback rate as measured without any smooth filter, with the values of EWMA smoothed playback-rate SPR over 2500 millisecond. On FIG. 2, X axis denotes time, Y axis denotes rate value in MBits/s. While the "brut" playback-rate is subject to "high frequency" fluctuations the smoothed playback-rate SPR is almost constant. After 550 ms since the start of the data flow, the smoothed playback rate SPR is constant and doesn't change till bigger fluctuations at the application, after 2300 ms, occur.

It is possible to measure the elapsed duration between a time of an issue of a packet by the sending node SN to the receiving node RN and a reception by the sending node SN of the packet issued by the receiving node RN immediately after receiving it. This measured elapsed duration is the "Round Trip Time" or RTT.

The application AP performs polling on the buffer BU by issuing a receiving call on the protocol engine. This receiving call sends an amount of data, the application AP desires to fetch from the buffer BU. So, the data fetching is fully controlled by the application AP. Ideally, in streaming applications, the data fetching is performed timely equidistantly in constant-sized portions, size of these portions, also called "chunk" is denoted "chunkSize". However, in real life none (non-real-time) application can reach this equidistant fetching approach (also called "Constant Bit Rate data sink). If the receiving call of the application AP is delayed, the amount of data, stored in the buffer BU has increased, and consequently one needs either to increase the frequency of the receiving calls to increase the amount of data, or increase the portion size fetched within one receiving call or even both. For example, the application AP streams an uncompressed video-feed in 24 frames per second. Within one second, the application AP acquires 24 picture-frames from the buffer BU. If each frame is received individually from the buffer BU, based on the fact that each frame has the same size, the chunk size is the size of one frame.

Then, playback rate fluctuations with high amplitude, for example as shown on FIG. 2 after 2300 ms, due to application's receiving calls can be controlled by periodic sending rate updates from receiving node RN to sending node SN.

In order to alleviate the drawback of high transmission delays, the rate updates will be sent periodically, whereby the update period is expressed in fractions of the RTT of the connection. However, the minimum period value must be bound to some fixed value. The period value can be based for example on empiric investigations. Used fractions of RTT corresponds for example to ¼ RTT. A minimum value of RTT fraction is 10 ms with RTT values greater than 40 ms.

Advantageously, the period with which the test on the buffer-occupancy is conducted is equal to a fraction of the round trip time RTT.

According to an embodiment of the invention, the step of determining the desired sending rate DSR value is triggered by a result of a test on the occupancy of the buffer BU, and in that this test is conducted periodically.

Figure 4:
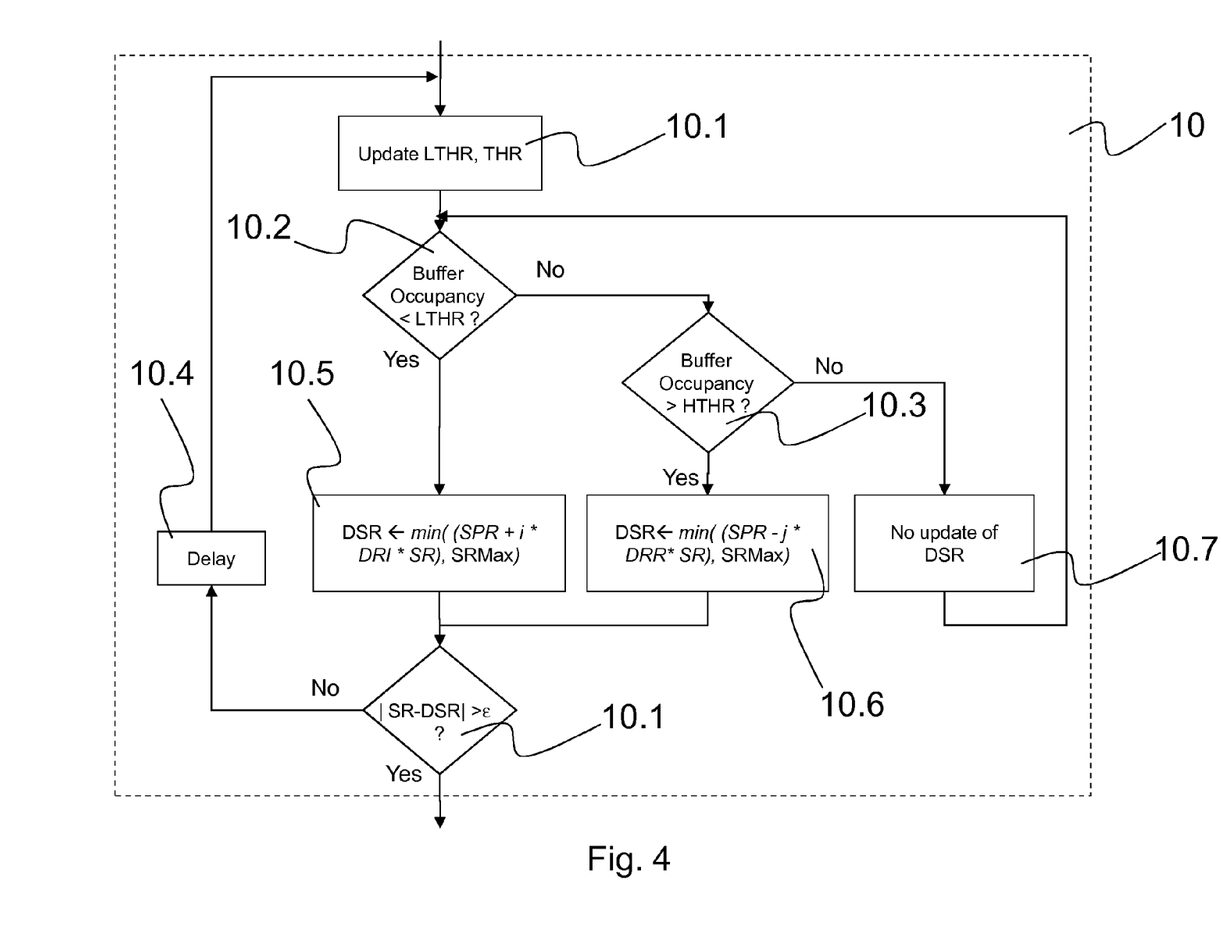
FIG. 4: a detailed flowchart of the step 20 of determination of a desired sending rate DSR of a method according to the invention.

FIG. 4 shows an example of implementation for realizing the step 10 of determination of desired sending rate DSR.

Decision about sending rate increase or decrease, above or below the current smoothed playback-rate SPR value, is based on the occupancy BO of the buffer of the receiving node RN: Two steps 10.2 and 10.3 are test related to buffer occupancy.

According to an embodiment of the invention, the test on the buffer-occupancy consists in determining if the buffer occupancy is lower than a low threshold LTHR value or greater than a high threshold HTHR value.

If the buffer occupancy BO exceeds a high threshold value HTHR, respectively low threshold LTHR value, the desired sending rate DSR value will be reduced below, respectively raised above, the current smooth playback-rate SPR (cf. steps 10.5 and 10.6 shown on FIG. 4).

Advantageously, the low threshold LTHR value and the high threshold HTHR value are dynamically assigned.

Value of the high threshold HTHR and low threshold LTHR are dynamically assigned during a step 10.1. The dynamic feature of high and/or low threshold values assignment is one of major differences with state-of-the-art implementations of rate-based Flow Control. This avoids the non-empty buffer underruns as shown on FIG. 4.

Advantageously, the low threshold LTHR value is calculated from the size of chunkchunkSize); the current sending rate SR and the round trip time value RTT).

Hereby, the high threshold HTHR can be calculated based on the maximum chunk size the application AP receives from the buffer BU (e.g. 2*chunkSize) and the existing BDP which is here the product of the current sending rate with the RTT. BDP is a very important parameter in the area of transport protocols since it represents the amount of data, which can be sent, before a reaction of data sending can be performed (SR*RTT).

Advantageously, the high threshold HTHR value depends on the size of chunks chunkSize; the current sending rate SR, the buffer storage capacity totalBufferSize and the round trip time value RTT.

Advantageously, the high threshold value HTHR is assigned according to following the formula: HTHR=totalBufferSize−max(2*chunkSize, SR*RTT).

From a performance point of view, a buffer BU underrun is more critical than a buffer BU overflow. So, it's not sufficient to take here into calculations only chunk size at the application AP level and the BDP for assigning a low threshold LTHR value.

On links with a considerable error rate or just congested links, an additional factor needs to be taken into account: a lost packet causes a gap in the data stream which is stored in the buffer BU, which prevents the application AP from receiving data beyond this gap. This situation is illustrated in FIG. 4a. The buffer BU is represented as a rectangular recipient. At a time $t_1$, one illustrates, coloured in black, parts of the buffer BU filled with received data. Empty parts of the buffer are set in "white" colour. The white part between two black parts corresponds to a missing packet. So there is a difference between the amount of data stored in the buffer (denoted as "BO" on FIG. 4a) figured by the highest part of the "recipient" and the amount of data $BR_1$ that is readable from the buffer BU, in one piece.

Hereby, the higher the packet loss rate is, the bigger is the difference between data stored in and readable from the buffer (stored/readable difference).

Figure 3A:
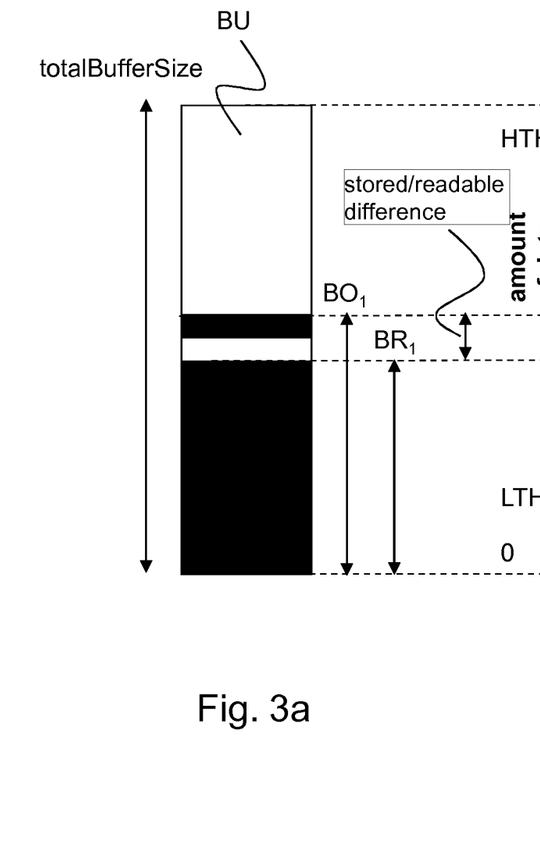
FIG. 3a: an illustration of a non-empty buffer underrun situation at a given time $t_1$.
Figure 3B:
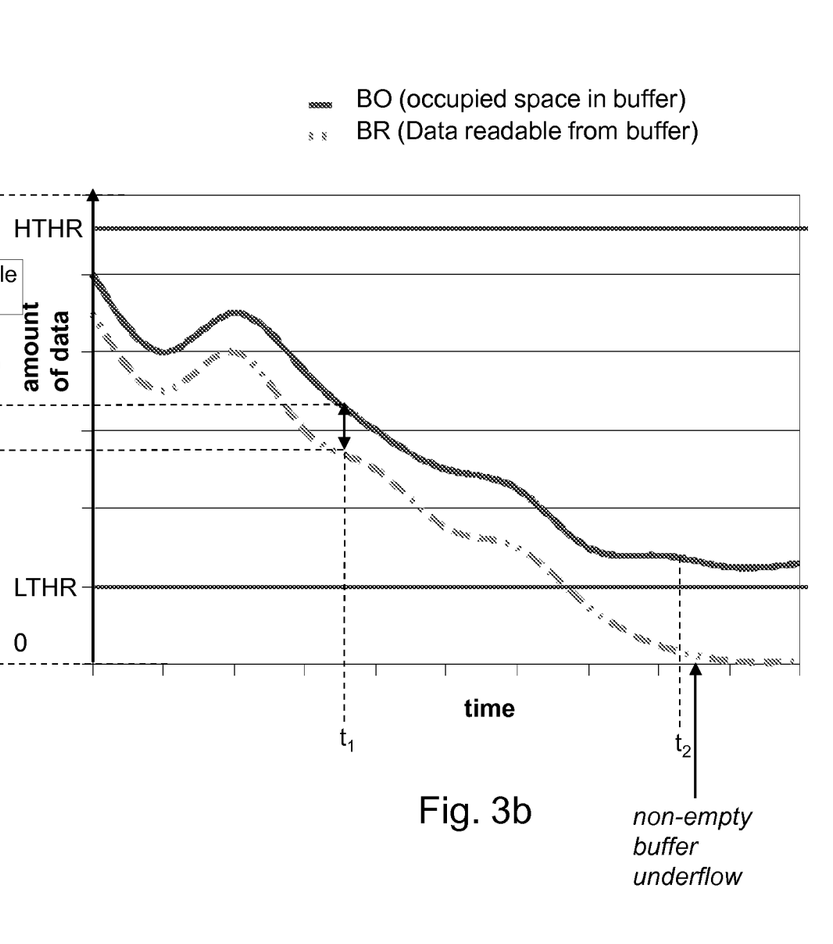
FIG. 3b: a graph showing temporal evolution of buffer occupancy and of amount of readable data from buffer.

It's essential to take into account that stored/readable difference for determination of low threshold LTHR value. If the low threshold LTHR value is assigned only from is the maximum of chunk size and BDP, as well as arbitrary fixed values used by Wang, a buffer underrun could happen, meaning the application AP can't receive data from the buffer BU immediately, even if the buffer BU is not empty. This "non-empty buffer underrun" situation arises when the stored/readable difference becomes bigger than the low threshold LTHR value. This situation is illustrated on the graph of temporal evolution of buffer occupancy shown on FIG. 3b, for time greater than $t_2$.

That the reason why the low threshold LTHR value is set to the maximum of chunk size and BDP (e.g. SR*RTT) plus the maximum of the previous introduced stored/readable difference, denoted as "K".

LTHR=max (2*chunkSize; SR*RTT)+$K$

Since by addition of the K value, the low threshold value LTHR could exceed the high threshold HTHR value, the low threshold value LTHR must be also limited to a value smaller than the high threshold HTHR value (e.g. totalBufferSize−4*chunkSize) in this case.

Advantageously, the low threshold LTHR value is assigned according to following the formula: LTHR=min (max (2*chunkSize; SR*RTT)+K; totalBufferSize−4*chunkSize), wherein K is an empiric value.

Advantageously, K is a value determined from a network model.

The amount of rate increase/decrease needs to rely on the current sending rate (e.g. small fractions of the sending rate, like DRI=2% for increase and DRR=1% for decrease). Since a filled buffer is more favourable than an empty buffer, the decrease value (the reduction value of the sending rate) should be smaller than the increase value (the increase value of the sending rate), causing the buffer to empty more slowly than to fill.

In any case, a periodic rate update has never to exceed maximum sending rate of the sending node.

After sending a sending rate adjustment to the sender, the receiving node RN must delay the following BO evaluation, as well as the periodic rate updates. This delay is figured by the box denoted as 10.4. Because a sending rate adjustment realized by the sending node will not have an effect on the receiver's BO before at least one RTT after the adjustment message was sent by the receiver. Therefore the BO evaluation shall be delayed at least one RTT (preferable 2*RTT).

If two consecutive BO evaluations drive to a similar conclusion on threshold exceeding, the rate will be increased/decreased more aggressively after the second of these evaluations.

For instance, in case the buffer-occupancy BO exceeds the low threshold LTHR value after two consecutive BO evaluations, the desired sending rate DSR is determined from a number of consecutive BO evaluations having driven to the same conclusion.

Advantageously, the step of determining the desired sending rate DSR further comprises a step of determining a number i of consecutive buffer occupancy test stating that the playback-rate SPR is lower than the low threshold LTHR value and a step of determining a number j of consecutive buffer occupancy test stating that the playback-rate SPR value is lower than the low threshold LTHR value.

Advantageously, when the test on the buffer-occupancy determines as a result that the buffer occupancy is lower than the low threshold LTHR value, the desired sending rate DSR value is determined according to following the formula: DSR=min((SPR+i*DRI*SR), SRMax)

Let i be the number of consecutive detection that the smoothed playback-rate

SPR is lower than the low threshold LTHR value, and DRI the mentioned increase value, then the desired sending rate DSR shall be calculated as follows:

DSR=min((SPR+$i$*DRI*SR), SRMax)

Advantageously, when the test on the buffer-occupancy determines as a result that the buffer occupancy is greater than the high threshold HTHR value, the desired sending rate DSR value is determined according to following the formula: DSR=min((SPR−j*DRI*SR), SRMax).

Let i be the number of consecutive detection that the smoothed playback-rate SPR is greater than the high threshold HTHR value, and DRR the mentioned decrease value, then the desired sending rate DSR shall be calculated as follows:

DSR=min((SPR−$i$*DRR*SR), SRMax)

If the current calculated DSR hasn't changed significantly within the update period, meaning the update process would send the same value than the previous sent DSR update or just an insignificant change, than the sending rate update can be skipped in order to save bandwidth. A step of comparing values of DSR and SR is illustrated by step 1.8 on FIG. 4. ϵ is a threshold value having a constant empiric value.

Advantageously, the increase percentage value DRI is greater than the decrease percentage value DRR).

The invention claimed is:

1. A method for controlling data flow between a sending node and a receiving node over a packet switching network, wherein the data is sent to the receiving node at a current data rate, wherein an application in the receiving node reads the data stored in the buffer at a playback rate and in successive constant-sized portions, said method comprising, at the receiving node:
periodically performing a buffer occupancy test of a buffer in the receiving node to determine whether received data occupancy of the buffer is lower than a first threshold or greater than a second threshold, said second threshold being greater than the first threshold;
determining, in response to performing the buffer occupancy test, a desired sending rate for the sending node based at least in part on the playback rate; and
if the desired sending rate is different from the current data rate by at least a fixed amount, sending the desired sending rate to the sending node,
wherein the first threshold and the second threshold are dynamically assigned by the receiving node,
wherein the first threshold is calculated based at least on a size of a successive constant-sized portion of data, the current sending rate, and a round trip time, the round trip time being an elapsed time measured between a transmission of a first packet by the sending node to the receiving node and a reception by the sending node of a second packet, said second packet being transmitted by the receiving node in response to reception of said first packet, and
wherein the playback rate for determining the desired sending rate is determined by applying a smoothing technique to a series of prior playback rates via a temporal moving average method.

2. The method according to claim 1, the buffer having a storage capacity, wherein the low threshold value is assigned according to following the formula:

$$LTHR=min(max (2*chunkSize; SR*RTT)+K; totalBufferSize-4*chunkSize),$$

wherein K is an empirical value, and wherein the low threshold value is represented by the variable LTHR, the size of the successive constant-sized portion of data is represented by the variable chunkSize, the current sending rate is represented by the variable SR, the round trip time value is represented by the variable RTT, and the buffer storage capacity is represented by the variable totalBuffersize.

3. The method according to claim 2, wherein K is a value determined from a network modelisation.

4. The method according to claim 1, wherein the second threshold is determined based on the size of the successive constant-sized portion of data, the current sending rate, the buffer storage capacity, and the round trip time value.

5. The method according to claim 4, wherein the second threshold is assigned according to the following formula:

$$HTHR=totalBufferSize-max(2*chunkSize, SR*RTT);$$

wherein the second threshold is represented by the variable HTHR, the buffer storage capacity is represented by the variable totalBuffersize, the size of the successive constant-sized portion of data is represented by the variable chunkSize, the current sending rate is represented by the variable SR, and the round trip time value is represented by the variable RTT.

6. The method according to claim 1, wherein the period within which the buffer-occupancy test is periodically performed is equal to a fraction of the round trip time.

7. The method according to claim 1, wherein said method further comprises, at the receiving node, receiving a maximum sending rate of the sending node; and
wherein determining the desired sending rate further comprises:
determining a number i of consecutively performed buffer occupancy tests in which the playback rate is determined to be lower than the first threshold and
determining a number j of consecutively performed buffer occupancy tests in which the playback-rate value is determined to be greater than the second threshold.

8. The method according to claim 7, an increase percentage value being a fixed percentage value between 0% and 10%, wherein if the buffer occupancy test determines as a result that the buffer occupancy is lower than the first threshold, the desired sending rate is determined according to:

$$DSR=min((SPR+i*DRI*SR),SRMax);$$

wherein the desired sending rate is represented by the variable DSR, the smoothed playback rate is represented by the variable SPR, the desired rate increase percentage value is represented by the variable DRI, the current sending rate is represented by the variable SR, and the maximum sending rate is represented by the variable SRMax.

9. The method according to claim 7, a decrease percentage value being a fixed percentage value between 0% and 10%, wherein if the buffer occupancy test determines as a result that the buffer occupancy is greater than the second threshold, the desired sending rate value is determined according to the following formula:

$$DSR=min((SPR-j*DRR*SR),SRMax);$$

wherein the desired sending rate is represented by the variable DSR, the smoothed playback rate is represented by the variable SPR, the desired rate reduction percentage value is represented by the variable DRR, the current sending rate is represented by the variable SR, and the maximum sending rate is represented by the variable SRMax.

10. The method according to claim 1, wherein the temporal moving average method is an Exponentially Weighted Moving Average (EWMA).

11. Receiver apparatus in a first node for controlling data flow between a second node and a first node over a packet switching network comprising a plurality of nodes, wherein the data is sent to the first node at a current data rate, the receiver apparatus comprising:
a buffer for storing data received from said second node;
an application for reading the data stored in the buffer at a playback rate and in successive constant-sized portions; and
a processor for:
periodically performing a buffer occupancy test of a buffer in the first node to determine whether received data occupancy of the buffer is lower than a first threshold or greater than a second threshold, said second threshold being greater than the first threshold;
determining, in response to performing the buffer occupancy test, a desired sending rate for the second node based at least in part on the playback rate; and
if the desired sending rate is different from the current data rate by at least a fixed amount, sending the desired sending rate to the second node,
wherein the first threshold and the second threshold are dynamically assigned by processor in the first node, wherein the first threshold is calculated by the processor based at least on from a size of the constant-sized portions of data, the current sending rate, and a round trip time, the round trip time being an elapsed time measured between a transmission of a first packet by the second node to the first node and a reception by the second node of a second packet, said second packet being transmitted by the first node in response to reception of said first packet, and wherein the playback rate for determining the desired sending rate is determined by the processor by applying a smoothing technique to a series of prior playback rates via a temporal moving average method.

12. The receiver apparatus according to claim 11, the buffer having a storage capacity, wherein the low threshold value is assigned according to following the formula:

LTHR=min(max(2*chunkSize;SR*RTT)+$K$;totalBufferSize−4*chunkSize), wherein K is an empirical value, and wherein the low threshold value is represented by the variable LTHR, the size of the successive constant-sized portion of data is represented by the variable chunkSize, the current sending rate is represented by the variable SR, the round trip time value is represented by the variable RTT, and the buffer storage capacity is represented by the variable totalBuffersize.

13. The receiver apparatus according to claim 12, wherein K is a value determined from a network modelisation.

14. The receiver apparatus according to claim 11, wherein the second threshold is determined based on the size of the successive constant-sized portion of data, the current sending rate, the buffer storage capacity, and the round trip time value.

15. The receiver apparatus according to claim 14, wherein the second threshold is assigned according to the following formula:

HTHR=totalBufferSize−max(2*chunkSize,SR*RTT);

wherein the second threshold is represented by the variable HTHR, the buffer storage capacity is represented by the variable totalBuffersize, the size of the successive constant-sized portion of data is represented by the variable chunkSize, the current sending rate is represented by the variable SR, and the round trip time value is represented by the variable RTT.

16. The receiver apparatus according to claim 11, wherein the period within which the buffer-occupancy test is periodically performed is equal to a fraction of the round trip time.

17. The receiver apparatus according to claim 11, wherein said method further comprises, at the receiving node, receiving a maximum sending rate of the sending node; and wherein determining the desired sending rate further comprises:
determining a number i of consecutively performed buffer occupancy tests in which the playback rate is determined to be lower than the first threshold and
determining a number j of consecutively performed buffer occupancy tests in which the playback-rate value is determined to be greater than the second threshold.

18. The receiver apparatus according to claim 17, an increase percentage value being a fixed percentage value between 0% and 10%, wherein if the buffer occupancy test determines as a result that the buffer occupancy is lower than the first threshold, the desired sending rate is determined according to:

DSR=min((SPR+$i$*DRI*SR),SRMax);

wherein the desired sending rate is represented by the variable DSR, the smoothed playback rate is represented by the variable SPR, the desired rate increase percentage value is represented by the variable DRI, the current sending rate is represented by the variable SR, and the maximum sending rate is represented by the variable SRMax.

19. The receiver apparatus according to claim 17, a decrease percentage value being a fixed percentage value between 0% and 10%, wherein if the buffer occupancy test determines as a result that the buffer occupancy is greater than the second threshold, the desired sending rate value is determined according to the following formula:

DSR=min((SPR−$j$*DRR*SR),SRMax);

wherein the desired sending rate is represented by the variable DSR, the smoothed playback rate is represented by the variable SPR, the desired rate reduction percentage value is represented by the variable DRR, the current sending rate is represented by the variable SR, and the maximum sending rate is represented by the variable SRMax.

20. The receiver apparatus according to claim 11, wherein the temporal moving average method is an Exponentially Weighted Moving Average (EWMA).

* * * * *